US 7,852,196 B1

(12) United States Patent
Adams

(10) Patent No.: US 7,852,196 B1
(45) Date of Patent: Dec. 14, 2010

(54) SYSTEMS AND METHODS FOR ELECTRONIC PREMISES ACCESS

(75) Inventor: Thomas Mark Adams, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 967 days.

(21) Appl. No.: 11/677,468

(22) Filed: Feb. 21, 2007

(51) Int. Cl.
*G06F 7/04* (2006.01)

(52) U.S. Cl. .............. 340/5.86; 340/5.2; 340/5.61; 340/5.7; 340/5.8; 705/50; 705/73; 713/185

(58) Field of Classification Search ............ 340/5.86
See application file for complete search history.

(56) References Cited

U.S. PATENT DOCUMENTS

| 2003/0052768 A1* | 3/2003 | Maune ............ 340/5.53 |
| 2003/0065678 A1* | 4/2003 | Mansoori .......... 707/104.1 |
| 2003/0187798 A1* | 10/2003 | McKinley et al. ....... 705/50 |
| 2004/0006699 A1* | 1/2004 | von Mueller et al. ..... 713/185 |
| 2006/0001524 A1* | 1/2006 | Thorn ............. 340/5.86 |
| 2006/0267773 A1* | 11/2006 | Roque ............ 340/572.7 |
| 2007/0013610 A1* | 1/2007 | Mooney et al. ........ 345/2.1 |
| 2007/0016790 A1* | 1/2007 | Brundage et al. ....... 713/176 |
| 2007/0180262 A1* | 8/2007 | Benson ............ 713/186 |

* cited by examiner

*Primary Examiner*—Benjamin C Lee
*Assistant Examiner*—Curtis J King

(57) ABSTRACT

Systems and methods for electronic premises access are disclosed. Some method embodiments comprise receiving a credential at a portal to a secure premises, identifying an issuing authority of the credential, electronically validating the credential with the issuing authority, and permitting entry to the secure premises if the credential is valid. Other method embodiments comprise receiving an identity credential and information indicating that there is an emergency at a portal to a secure premises, performing a cursory validation of the identity credential, permitting entry to the secure premises if the identity credential appears valid, identifying an issuing authority of the identity credential, and electronically validating the identity credential with the issuing authority, wherein permitting entry to the secure premises occurs before identifying the issuing authority of and electronically validating the identity credential.

20 Claims, 5 Drawing Sheets

SYSTEMS AND METHODS FOR ELECTRONIC PREMISES ACCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditionally, law enforcement or public safety agents responding to a distress call access a commercial building by presenting their credentials to security personnel, if present, upon arrival to the building. Their credentials may be a shield or other form of identification. Similarly, they may access a residential home by presenting their credentials to a resident upon arrival to the home. In some instances, the appropriate uniform may alone be sufficient to gain access to the secure premises. In the event that security personnel, the space owner, or other individual with access are not present, law enforcement or public safety agents must find another means of entering the building or home, including forced entry. This often slows the response time of these emergency personnel and causes damage to the physical structure. In the event that security personnel are present to receive the law enforcement or public safety agents, a quick display of their shield or other identification is typically sufficient to gain access to the building. If the shield is stolen and the individual presenting it is not the rightful owner, unauthorized individuals gain access to what was intended to be a secure space.

As the focus on security continues to intensify, complex security systems protecting buildings render the buildings "intelligent". Access to intelligent buildings becomes increasingly difficult for law enforcement and public safety agents, and traditional methods of gaining access to spaces protected by these security systems become impractical, if not impossible. For instance, a secure commercial office building or apartment complex may require law enforcement or public safety agents to pass through a number of secure doors to answer a distress call. If security personnel, the building owner or manager, or some other individual with access are not present to permit access, law enforcement or public safety agents must resort to forcible entry. Given the size of such building structures, multiple doors must be broken down, thus causing extensive damage and slowing response time, perhaps too much. Even if security personnel are present to permit access, manual verification of law enforcement or public safety credentials and subsequent manual entering, e.g. unlocking numerous secure doors using multiple keys, may again result in an untimely response. Likewise, unauthorized access is a risk, whether by individuals having wrongful possession of the credentials displayed or by individuals whose authorization does not extend to a particular building or is not effective at that particular time.

SUMMARY

Systems and methods for electronic premises access are disclosed. Some method embodiments comprise receiving a credential at a portal to a secure premises, identifying an issuing authority of the credential, electronically validating the credential with the issuing authority, and permitting entry to the secure premises if the credential is valid.

Other method embodiments comprise receiving an identity credential and a warrant at a portal to a secure premises, identifying an issuing authority of the identity credential and an issuing authority of the warrant, electronically validating the identity credential with the issuing authority of the identity credential and the warrant with the issuing authority of the warrant, and permitting entry to the secure premises if the identity credential and warrant are valid.

Still other method embodiments comprise receiving an identity credential at a portal to a secure premises and information indicating that there is an emergency, performing a cursory validation of the identity credential, permitting entry to the secure premises if the identity credential appears valid, identifying an issuing authority of the identity credential, and electronically validating the identity credential with the issuing authority, where performing the cursory validation and permitting entry occur before identifying the issuing authority and electronically validating the identity credential.

These and other features will be more clearly understood from the following detailed description taken in conjunction with the accompanying drawings and claims.

Figure 1:
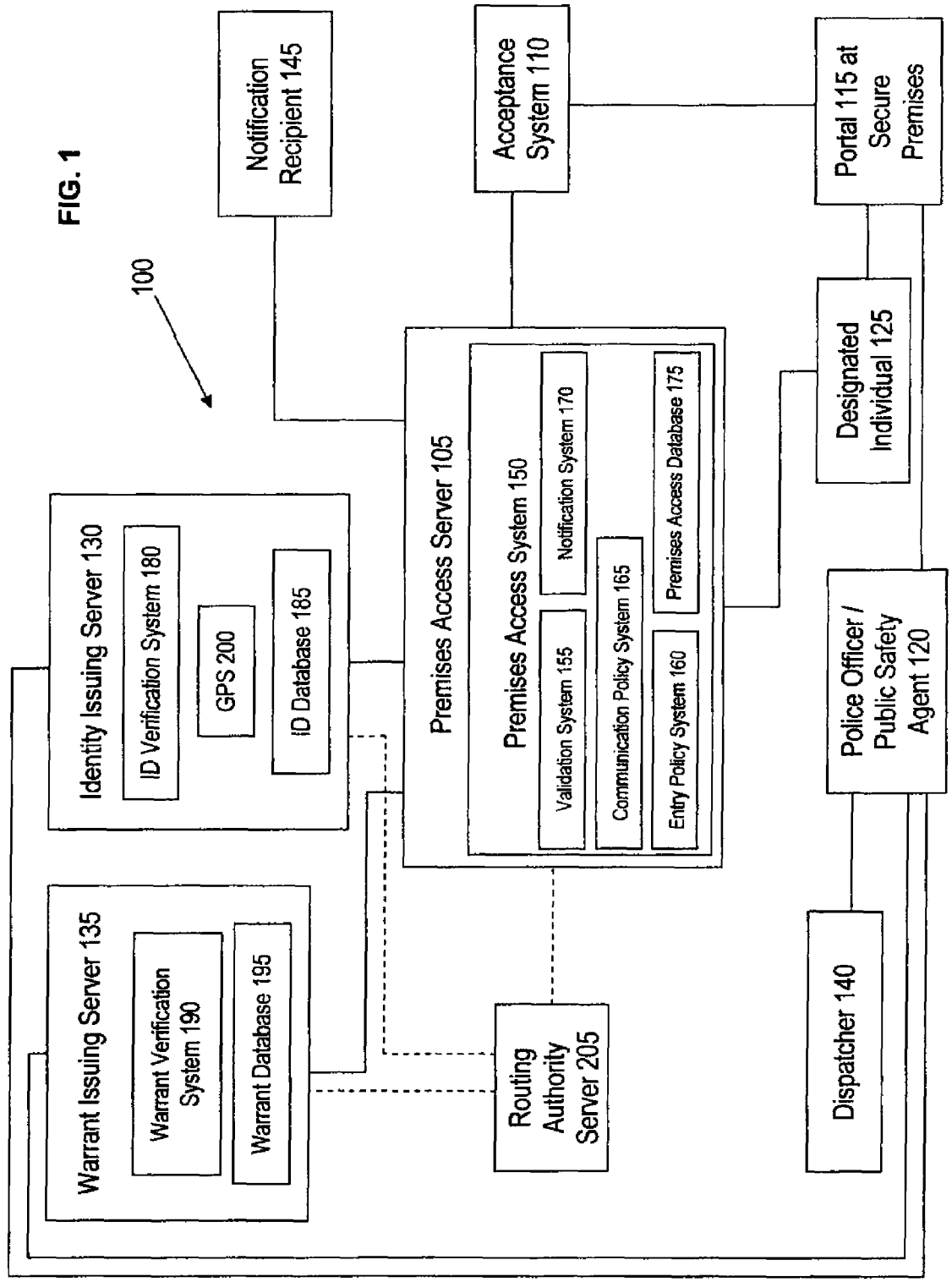
FIG. 1 is a block diagram of an illustrative architecture for implementing methods of electronic premises access.

Various embodiments of the invention will now be described with reference to the accompanying drawings, wherein like reference numerals are used for like features throughout the several views. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to suggest that the scope of the disclosure, including the claims, is limited to that embodiment.

NOTATION AND NOMENCLATURE

Certain terms are used throughout the following description and claims to refer to particular components. This document does not intend to distinguish between components that differ in name but not function. In the following discussion and in the claims, the terms "including" and "comprising" are used in an open-ended fashion, and thus should be interpreted to mean "including, but not limited to . . . ".

DETAILED DESCRIPTION

A computer-based system for implementing methods of electronic premises access permits entry of authorized law enforcement or public safety personnel into a secure premises without the need for human intervention from on-site personnel, including the premises owner, manager, resident or occupant. Because the premises access system is computer-based and does not require such intervention, validation of access credentials and grant of access is performed real-time, thereby eliminating the need for law enforcement or public safety personnel to use forcible entry resulting in damage to the secure premises. Electronic validation of access credentials also protects against misused or fraudulent use of identity and entry credentials, for example, service of a warrant at the wrong address or unauthorized access by individuals wrongfully in possession of a valid police officer shield. Moreover, requests for access and the grant or denial of each are recorded and communicated to appropriate entities, for example, law enforcement or the premises owner. Thus, the premises access system provides enablement and accountability for law enforcement agencies and public safety organizations.

To capitalize on these potential benefits, systems and methods for electronic premises access are disclosed. The methods begin when a police officer, public safety agent, or designated individual presents identity and/or entry credentials to a portal located at a secure premises, thereby requesting access to that premises. Entry of authorized law enforcement or public safety personnel into a secure premises may be either a policy-based emergency or verified legally approved access. The latter may occur when a police officer displays his shield and a warrant and requests access to the secure premises in order to serve that warrant. A policy-based emergency entry may occur when a police officer or public safety agent, such as a firefighter, presents identification and requests access to the secure premises in order to respond to an on-going emergency situation. Entry of designated individuals who are neither law enforcement nor public safety agents may be policy-based approved access. After receiving a request for entry, an electronic premises access system contacts the authorities that issued the credentials to validate their authenticity, and upon finding that the credentials are valid, permits entry to the secure premises. A record may be made of requests for entry and the grant or denial of each request. The electronic premises access system may provide notice to appropriate entities.

Computer-based systems are disclosed for implementing this methodology. Identity credentials and entry credentials are presented by means of wireless communication in some embodiments and by manual means in others, such as using a keypad or swiping a smart card through a card reader. These credentials are electronically transmitted to the premises access system, which then validates the credentials by communicating with an issuing authority using a computer-network connection. Once the credentials are validated, the premises access system communicates with the portal at the secure premises to permit entry.

FIG. 1 depicts a block diagram of an illustrative architecture 100 that may be used to implement the disclosed methods for electronic premises access. The architecture 100 is accessed by a police officer/public safety agent 120 and/or a designated individual who presents his credentials at an entry portal 115 of the secure premises. The architecture 100 includes an acceptance system 110 that receives the credentials from the entry portal 115 and transmits them to a premises access system 150 located on a premises access server 105. The premises access system 150 is configured to validate the credentials presented, unlock the portal 115 to permit entry, and alert a notification recipient 145 of the entry.

The premises access system 150 validates the credentials presented by contacting the credential issuing authority and obtaining further verification if necessary. The premises access system 150 contacts a warrant issuing authority, such as a court, by accessing the court's warranty issuing server 135 to validate entry credentials that are warrants. The premises access system 150 also contacts an identity issuing authority, such as a law enforcement agency or emergency services organization, by accessing its identity issuing server 130 to validate identity credentials, including shields, badges and other forms of personal identification. For further verification, the premises access system 150 may require the identity issuing authority to order a dispatcher 140 to initiate direct, live communication with the police officer/public safety agent 120 in the field. Alternatively, the premises access system 150 may contact a routing authority by accessing a routing authority server 205 to request validation of credentials. In response, the routing authority server 205 contacts the relevant issuing authorities, described above, to validate credentials and forwards information provided by the issuing authorities to the premises access system 150.

The secure premises is a commercial office building, a residential apartment complex, or any other building having one or more portals 115 where it is desirable to control access therethrough using the premises access system 150. The server 105 on which the premises access system 150 resides may be physically located at the secure premises site, such as in the manager's office at an apartment complex or a building security office in an office highrise, or off-site, meaning in another building located remotely from the secure premises.

The police officer/public safety agent 120 is a local, state, or federal police officer, firefighter, paramedic or other emergency services representative. The designated individual 125 is a person identified by the owner, manager, occupant or resident of the secure premises to have authority, limited or not, to enter the secure premises. For example, the secure premises may be an apartment complex. A resident of that apartment complex may authorize a designated individual 125 to access his apartment in order to take in the mail and feed his cat while the resident is out of town. As another example, a designated individual 125 may be a lawn service representative who cares for and maintains the grounds surrounding a large office complex and is authorized to access the grounds by the complex owner.

Credentials that may be presented to access the secure premises include identity credentials and entry credentials. These credentials may be encrypted to prevent fraudulent misuse by unauthorized individuals. Identity credentials verify the personal identity of an individual. For example, a police officer's shield or badge is an identity credential uniquely identifying the particular officer. It implies that the bearer of the shield is in fact the individual identified by a name or associated with a number on the shield. Identity credentials may be issued by law enforcement agencies and emergency services organizations. An entry credential, on the other hand, does not verify the identity of its bearer but simply implies that its bearer has authority to access a secure premises. An entry credential may take several forms, including a warrant, smart card, or passcode. Entry credentials may be issued by a court, such as in the case of a warrant, a law enforcement agency, and emergency services organizations. Also, the premises access authority, the entity governing the premises access system 150, may issue an entry credential to a designated individual 125 for reasons including those described above.

An entry credential may permit limited access of the secure premises. Returning to scenario described above where the apartment resident designated an individual 125 to take in his mail and feed his cat while he is out of town, it may be desirable in that situation to limit access of the apartment complex by the designated individual 125 to a particular building in the complex, a particular apartment in that building, and for the period of time coinciding with the resident's absence. In the case of the lawn service representative, also described above, while this representative has a regular, continuing need to access the grounds in order to do his job, he has no need to access all parts of the office complex. As such, it may be desirable to permit continuous access of the grounds but prohibit him from accessing the office complex interior.

The premises access system 150 includes a validation system 155, a communication policy system 165, an entry policy system 160, a notification system 170, and a premises access database 175. If the credentials transmitted by the acceptance system 110 are encrypted, the premises access system 150 decrypts the credentials to a useable format. The communication policy system 165 identifies the appropriate issuing authority and communicates this information to the validation system 155. To perform this function, the communication policy system 165 stores a set of rules that identifies an issuing authority as a function of information provided by the credential. For example, the communication policy system 165 directs the validation system 155 to contact a warrant issuing authority, such as a court, if the entry credential provided at the portal 115 is a warrant. If the credential is identified as having been issued by the premises access authority, which is the entity that manages the premises access system 150, the communication policy system 165 directs the validation system 155 to perform a check of its own system 155 records.

The validation system 155 evaluates credentials presented at the portal 115 and transmitted to the premises access system 150 by the acceptance system 110 by contacting the issuing authority, as identified by the communication policy system 165, and requesting information associated with the credentials. For credentials identified as having been issued by an outside authority, meaning an authority other than the premises access authority that governs the premises access system 155, the validation system 155 contacts the issuing authority directly, or indirectly through a routing authority. The validation system 155 compares data provided by the credentials with data provided by the issuing authority to determine the validity of the credentials and any limitations on access to the premises imposed by the credentials. In some embodiments, the validation system 155 may require that the issuing authority order a dispatcher 140 to initiate direct, live communication with the police officer/public safety agent 120 in the field for additional verification.

The entry policy system 160 determines whether the bearer of the credentials should be permitted entry into the secure premises. To perform this function, the entry policy system 160 stores a set of rules that defines who may enter a secure premises as a function of the validity and/or type of the credentials, as determined by the validation system 155. If the credentials are determined to be valid, the entry policy system 160 may release the lock at the portal 115 to permit entry of the police officer/public safety agent 120 and/or designated individual 125 into the secure premises. Moreover, if the credentials provide limited access to the secure premises, also as determined by the validation system 155, the entry policy system 160 may, as a matter of policy, release locks on interior doors of the secure premises to permit access only to regions of the secure premises permissible based on the credential.

The communication policy system 165 also identifies one or more notification recipients 145 to be informed of an entry to the secure premises and communicates this information to the notification system 170. Notification recipients 145 are determined from a list of guidelines defined within the communication policy system 165 and may include the premises owner, manager, resident, or occupant. If a notification recipient 145 is identified, the notification system 170 sends notice of the entry to the recipient 145 by email, wireless communication, or other means. Requests for access to the premises, the grant or denial of each request, and notifications sent to identified recipients 145 may be recorded in a log stored in the premises access database 175.

The warrant issuing server 135 resides at, or is under the control of, a warrant issuing authority, such as a court. The warrant issuing authority issues warrants which are later served by the police officer 120 at the secure premises. In some embodiments, the warrant may be issued and transferred in encrypted format by wireless communication to the police officer 120 in the field using, for example, a wireless telephone or a shield with an embedded electronic device that permits wireless communication. The details of each warrant issued by the court are recorded within the warrant database 195 located on the warrant issuing server 135. These details may include, for example, the date the warrant issued, the duration for which it remains valid, the subject of the warrant, whether it be a person or place, the limits of the warrant, the name of the judge, and the like. Each time the premises access system 150, or routing authority server 205 acting on behalf of the premises access system 150, makes a specific inquiry about the validity of a warrant presented as an entry credential for access to the secure premises, the warrant issuing server 135 retrieves information related to the warrant from the warrant database 195 and forwards this information to the validation system 155. Also, the warrant issuing server 135 records the details of the inquiry, including whether or not the warrant is valid at the time of the inquiry, in a log stored in the warrant database 195, thereby creating evidence that may be later used to prove the police officer 120 entered the secure premises under the authority of a valid warrant.

The identity issuing server 135 resides at, or is under the control of, an identity issuing authority, such the police department or emergency services department. The identity issuing authority issues identity credentials, including a shield, badge, or other form of identification, to its representatives. For example, the police department issues a badge or shield to each of its officers. Emergency services departments, like the fire department, issue similar identification to their personnel. The details of each identity credential issued are recorded within the ID database 185 located on server 130. These details may include, for example, the name of the police officer or emergency services agent to whom an identity credential is issued, a means to determine which identity credential is issued to a particular police officer or emergency services agent, such as a badge or shield number, and any restrictions on the identity credential, in particular whether the police officer or emergency services agent is on active duty, has been suspended, is on medical leave, or any other condition which may limit the use of the identity credential. Each time the premises access system 150, or routing authority server 205 acting on behalf of the premises access system 150, makes a specific inquiry about the validity of an identity credential presented for access to the secure premises, the identity issuing server 130 retrieves information related to the identity credential from the ID database 185 and forwards this information to the validation system 155. Also, the identity issuing server 130 may record the details of the inquiry, particularly whether or not the identity credential is valid at the time of the inquiry, in a log stored in the ID database 185.

In some embodiments, a global positioning system (GPS) 200 located on the identity issuing server 130 continuously tracks and reports the physical location of each identity credential, embedded in an electronic device as discussed above. Presumably, the location of the identity credential will also be the same physical location as the police officer/public service agent 120. The ability to track the physical location of the identity credential may permit the identity issuing authority to verify the police officer 120 is serving a warrant at the correct address, for example, or to dispatch additional police officers to that location if needed, as another example.

Communication of identity and/or entry credentials to the acceptance system 110 by the police officer/public safety agent 120 and designated individual 125 may be performed manually, including entering a passcode into a keypad or swiping a smart card through a card reader at the portal 115. However, the preferred method of communication is by wireless communication. In the preferred embodiment, the identity credential, e.g. shield or badge, of the police officer/public safety agent 120 contains an embedded electronic device which, when placed in proximity of the portal 115, wirelessly communicates with another electronic device at the portal 115 to transmit identity credential and/or entry credentials, e.g. a warrant, to the acceptance system 110. The credentials communicated to the acceptance system 110 in this manner may be encrypted. In the case of a warrant as an entry credential, the police officer/public safety agent 120 may be required to provide additional verification that he is in rightful possession of the shield (i.e. provide both identity and entry credentials) by providing a passcode that can be entered manually in a keypad also located at the portal 115, through live, direct communication with a dispatcher 140, using a biometric scanner at the portal 115, or providing a passcode encrypted on the shield.

Communication between the premises access system 150 and the acceptance system 110, the routing authority server 205, the warrant issuing server 135, and the identity issuing server 130 is by computer network connection. Similarly, communication between the acceptance system 110 and the portal 115 is also through a computer network connection. The premises access system 150 may send notification to a notification recipient 145 via email sent over a computer network connection or via telephone, either wireless or landline. Lastly, the dispatcher 140 may communicate with the police officer/public safety agent 120 via wireless means or landline telephone located at the portal 115.

Figure 2:
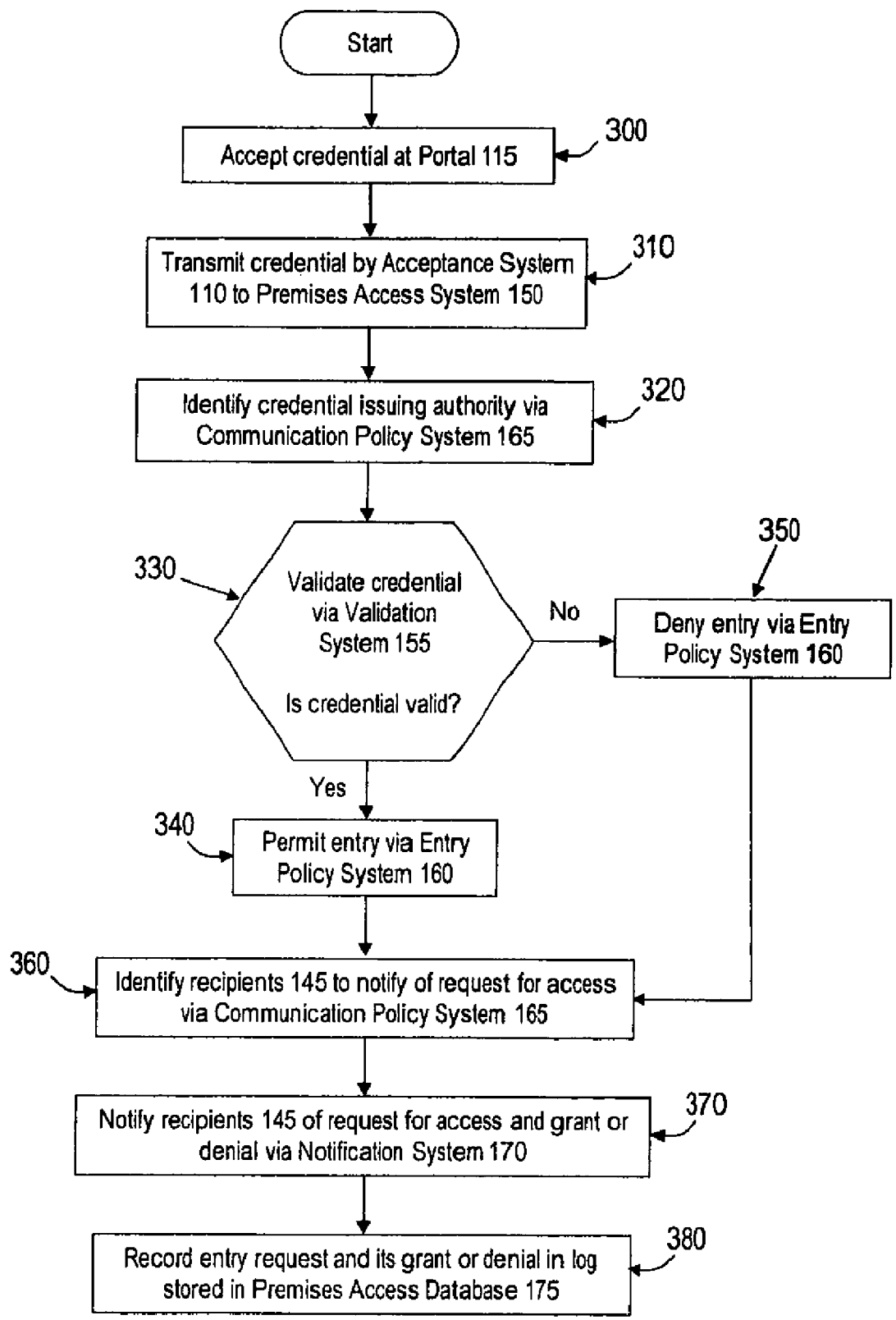
FIG. 2 is a flow chart of an illustrative method for entry of a designated individual into a premises secured by the premises access system depicted in FIG. 1.

Referring next to FIG. 2, a flowchart is provided to illustrate various method embodiments for electronic premises access in accordance with the present disclosure. In particular, this figure illustrates a method embodiment for entry by a designated individual 125 into a premises secured by the premises access system 150. The method begins when the designated individual 125 presents his entry credential at a portal 115 of the secure premises (block 300). This may entail entering a passcode into a keypad or swiping a smart card through a card reader. The acceptance system 110 then transmits the credential to the premises access system 150 (block 310). If the credential transmitted is encrypted, the premises access system 150 decrypts it to a useable format.

The communication policy system 165 determines the credential was issued by the premises access authority (block 320) and directs the validation system 155 to validate the credential by checking its own system 155 records (block 330). Validation includes checking to be sure the entry credential is active, meaning it has not expired or been revoked. If the validation system 155 determines the credential is valid, the entry policy system 160 transmits a signal to release the lock at the portal 115 to permit the bearer of the credential entry into the secure premises (block 340). Otherwise, the entry policy system 160 denies access (block 350).

The communication policy system 165 identifies notification recipients 145, if any (block 360). The notification system 170 sends notification of the entry, or denial of entry, to identified recipients 145 by email, wireless communication, or other means (block 370). The request for entry, its denial or grant, and any recipients 145 notified of the request are recorded in a log stored in the premises access database 175 (block 380).

Figure 3:
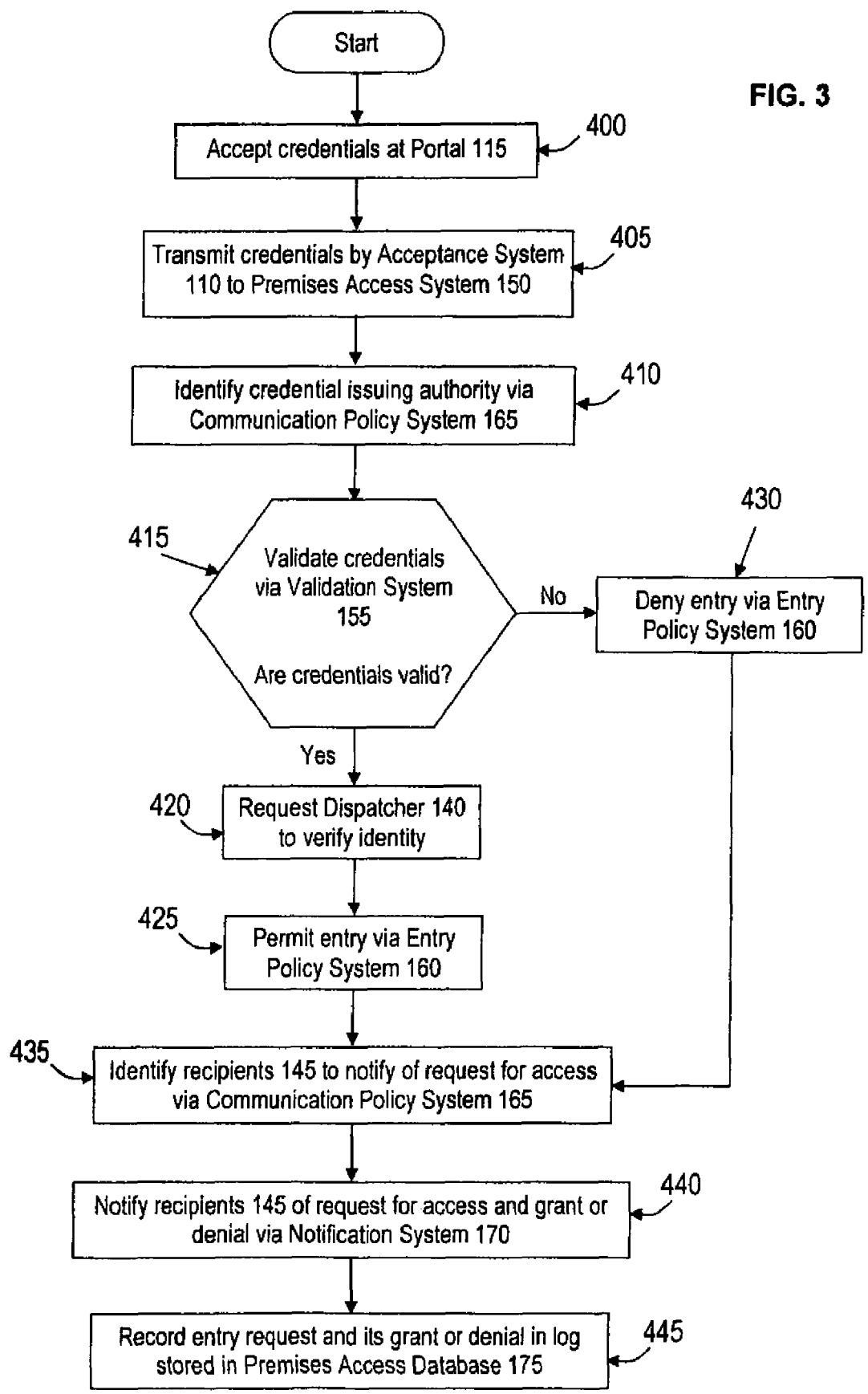
FIG. 3 is a flow chart of an illustrative method for entry of a police officer with a warrant.

Referring next to FIG. 3, a flowchart is provided to illustrate another method embodiment for electronic premises access. In particular, this figure illustrates a method embodiment for entry by a police officer 120 acting under authority of a warrant into a premises secured by the premises access system 150. Traditionally, prior to service of a warrant, a police officer applies for and secures a hardcopy warrant from a court. He then serves that hardcopy warrant or manually transfers the hardcopy warrant to another officer who does. In time critical situations, this manual process can delay or even prevent service of the warrant.

To minimize the time needed to secure and serve a warrant, the warrant issuing authority, or court, may wirelessly transmit the warrant to the shield or badge, embedded with a wireless communication device, belonging to the police officer 120 who will serve the warrant. The ability to wirelessly deliver a warrant in this manner allows another police officer to go to the court, secure the warrant, and request that the court electronically transmit the warrant to the police officer 120 in the field, whether in route to the secured premises or already there. This eliminates the time-consuming, traditional method of securing a hardcopy warrant and transferring that hardcopy warrant into the hands of the police officer serving it prior to its service.

The method illustrated by FIG. 3 begins when the police officer 120 presents his identity credential and entry credential, in this case a warrant, at a portal 115 of the secure premises (block 400). The warrant may have been wirelessly transmitted to his identity credential, as described above. If so, presentment of his identity credential and the warrant may entail passing his shield or badge, embedded with a wireless communication device, near another wireless communication device located at the portal 115 to transfer both his identity credential and the warrant wirelessly to the acceptance system 110. Alternatively, the identity credential and warrant may be distinct credentials. Presentment of both at the portal 115 is then required. In either scenario, the acceptance system 110 transmits the credentials to the premises access system 150 (block 405). If the credentials transmitted are encrypted, the premises access system 150 decrypts them to a useable format.

The communication policy system 165 recognizes the entry credential is a warrant (block 410) and directs the validation system 155 to validate the warrant by contacting the warrant issuing server 135 (block 415). Once contacted, the server 135 directs the warrant verification system 190 to retrieve data, if any, associated with the warrant and recorded in the warrant database 195. The server 135 forwards this data to the validation system 155 and records the warrant inquiry in a log stored in the warrant database 195. The validation system 155 then validates the warrant by cross-checking data provided to the premises access system 150 via the warrant with data retrieved from the warrant database 195.

Also, the communication policy system 165 recognizes the identity credential was issued by a law enforcement agency (block 410) and directs the validation system 155 to validate the identity credential by contacting the identity issuing server 130 (block 415). Once contacted, the server 130 directs the ID verification system 180 to retrieve data, if any, associated with the identity credential and recorded in the ID database 185. The server 130 forwards this data to the validation system 155. Additionally or alternatively, the GPS 200 may be used to provide additional assurance that the police officer 120 is serving the warrant at the correct physical address. Such verification is possible when the identity credential has an embedded device that emits a signal that can be tracked by the GPS 200, as described above.

In some embodiments, the premises access system 150 may require the identity issuing authority to provide further verification by directing a dispatcher 140 to initiate direct, live communication with the police officer 120 in the field (block 420). This communication permits the identity issuing authority to verify that the individual in possession of the identity credential is indeed the officer to whom it was issued. The identity inquiry and all actions taken by the identity issuing server 130 and the dispatcher 140 to verify the identity credential are recorded in a log stored in the ID database 185.

The validation system 155 then validates the identity credential by cross-checking data provided to the premises access system 150 via the identity credential with data retrieved from the ID database 185. Validation may include checking that the identity credential is active, meaning the identity credential has not been revoked and the police officer to whom it was issued is on active duty and has not been fired, retired, or suspended at the time of the inquiry.

If the validation system 155 determines the identity credential and warrant are valid, the entry policy system 160 transmits a signal to release the lock at the portal 115 to permit the police officer 120 entry into the secure premises (block 425). Otherwise, the entry policy system 160 denies access (block 430). The communication policy system 165 identifies notification recipients 145, if any (block 435). The notification system 170 sends notification of the entry to identified recipients 145 by email, wireless communication, or other means (block 440). The request for entry, its denial or grant, and any recipients 145 notified of the request are recorded in a log stored in the premises access database 175 (block 445).

Figure 4:
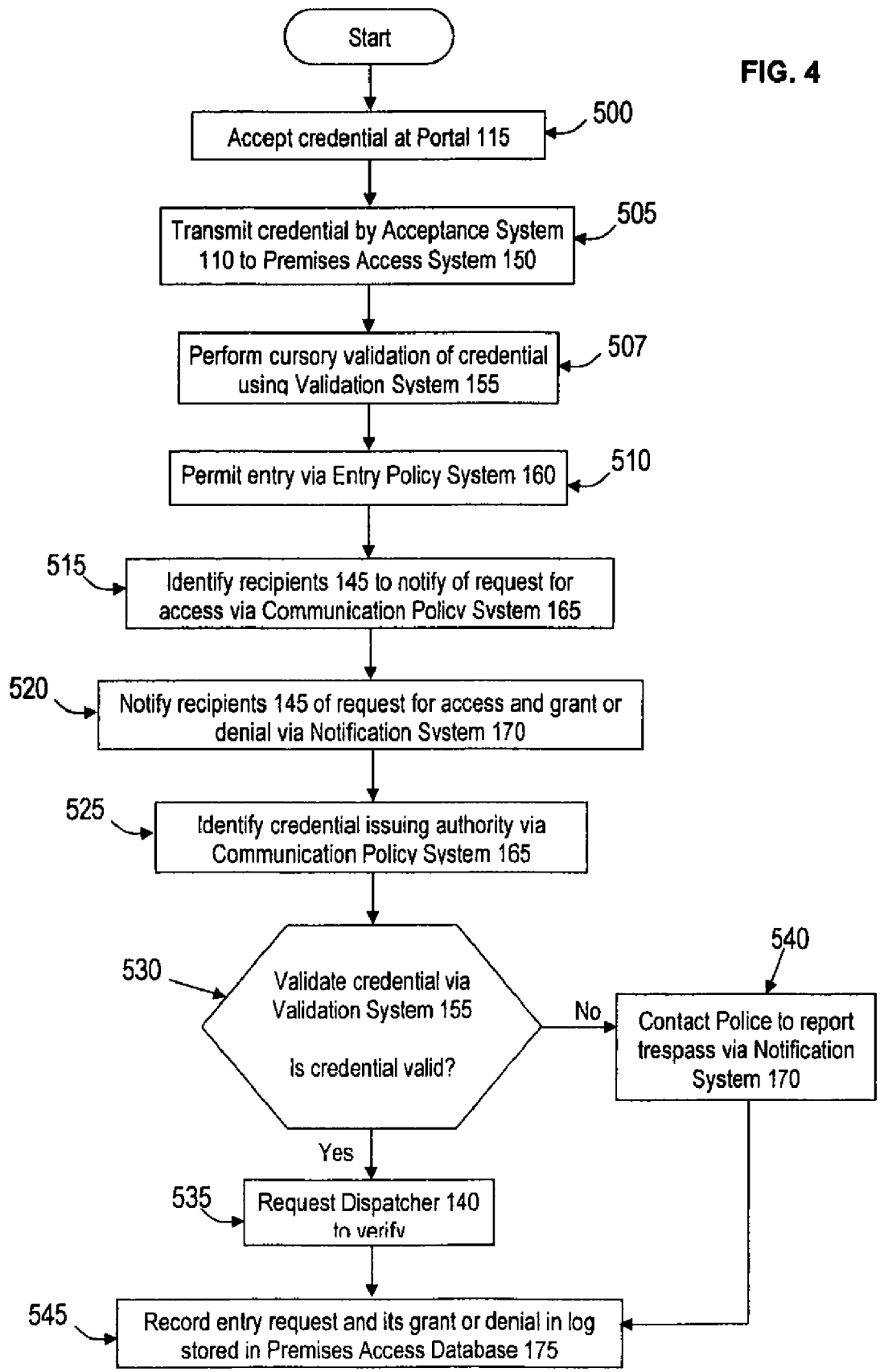
FIG. 4 is a flow chart of an illustrative method for entry of a police officer or public safety agent responding to an emergency.

Referring next to FIG. 4, a flowchart is provided to illustrate another method embodiment for electronic premises access. In particular, this figure illustrates a method embodiment for entry by a police officer/public safety agent 120 into a premises secured by the premises access system 150 in response to an emergency, for instance, a "911" call or a fire. The method begins when the police officer/public safety agent 120 presents his identity credential at a portal 115 of the secure premises and indicates there is an emergency situation within the secure premises requiring an immediate response (block 500). This may entail passing his shield, badge or other identification, embedded with a wireless communication device, near another wireless communication device located at the portal 115 to transfer his identity credential wirelessly to the acceptance system 110. In this scenario, the police officer/public safety agent 120 does not possess a warrant but instead provides indications of an emergency, such as entering an emergency passcode into a keypad located at the portal 115 or communicating with a security guard employed at the secure premises, if any. Alternatively, if the security system initiated the emergency contact (i.e. it triggered the alarm), the police officer/public safety agent 120 may simply provide his identity credential to the system already aware of the emergency.

The acceptance system 110 transmits the identity credential to the premises access system 150 (block 505). If the credential transmitted is encrypted, the premises access system 150 decrypts it to a useable format. Due to the urgency of the situation, the validation system 155 performs a cursory validation (block 507) of the identity credential, meaning it determines whether the identity credential is genuine based on the information provided by it. If the identity credential is genuine, for example, if the data provided by the credential is in the appropriate format for a valid police officer's shield, the entry policy system 160 transmits a signal to release the lock at the portal 115 to permit the police officer/public safety agent 120 entry into the secure premises (block 510). The communication policy system 165 identifies notification recipients 145, if any (block 515). The notification system 170 sends notification of the entry to identified recipients 145 by email, wireless communication, or other means (block 520).

As the police officer/public safety agent 120 accesses the secure premises through portal 115 and proceeds to respond to the emergency, the validation system 155 performs additional validation of the identity credential presented. The communication policy determines the issuing authority of the identity credential, whether a law enforcement agency or public services organization, (block 525) and directs the validation system 155 to validate the identity credential by contacting the identity issuing server 130 (block 530). Once contacted, the server 130 directs the ID verification system 180 to retrieve data, if any, associated with the identity credential and recorded in the ID database 185. The server 130 forwards this data to the validation system 155. Also, the GPS 200 may be used to verify the exact physical location of the police officer/public safety agent 120. Such verification is possible when the identity credential has an embedded device that emits a signal that can be tracked by the GPS 200, as described above.

The validation system 155 validates the identity credential by cross-checking data provided to the premises access system 150 via the identity credential with data retrieved from the ID database 185. Validation includes checking to be sure the identity credential is active, meaning the identity credential has not been revoked and the police officer/public safety agent to whom it was issued is on active duty and has not been fired, retired, or suspended at the time of the inquiry.

In some embodiments, the premises access system 150 may require the identity issuing authority to provide further verification by directing a dispatcher 140 to initiate direct, live communication with the police officer 120 in the field (block 535). This communication permits the identity issuing authority to verify that the individual in possession of the identity credential is indeed the officer to whom it was issued and that the situation is an emergency situation justifying warrantless entry into the secure premises. The identity inquiry and all actions taken by the identity issuing server 130 and the dispatcher 140 to verify the identity credential are recorded in a log stored in the ID database 185.

In the event that further investigation by the validation system 155 reveals that either the identity credential is invalid or that there is no emergency situation justifying a warrantless entry, the notification system 170 contacts a local police department to report an on-going trespass and request police intervention (block 540). Moreover, the validation system 155 may initiate actions to prevent further access by the potential trespasser as well as to prevent his departure from the premises prior to the arrival of the police. The request for entry and any determinations made by the validation system 155 are recorded in a log stored in the premises access database 175 (block 545).

Figure 5:
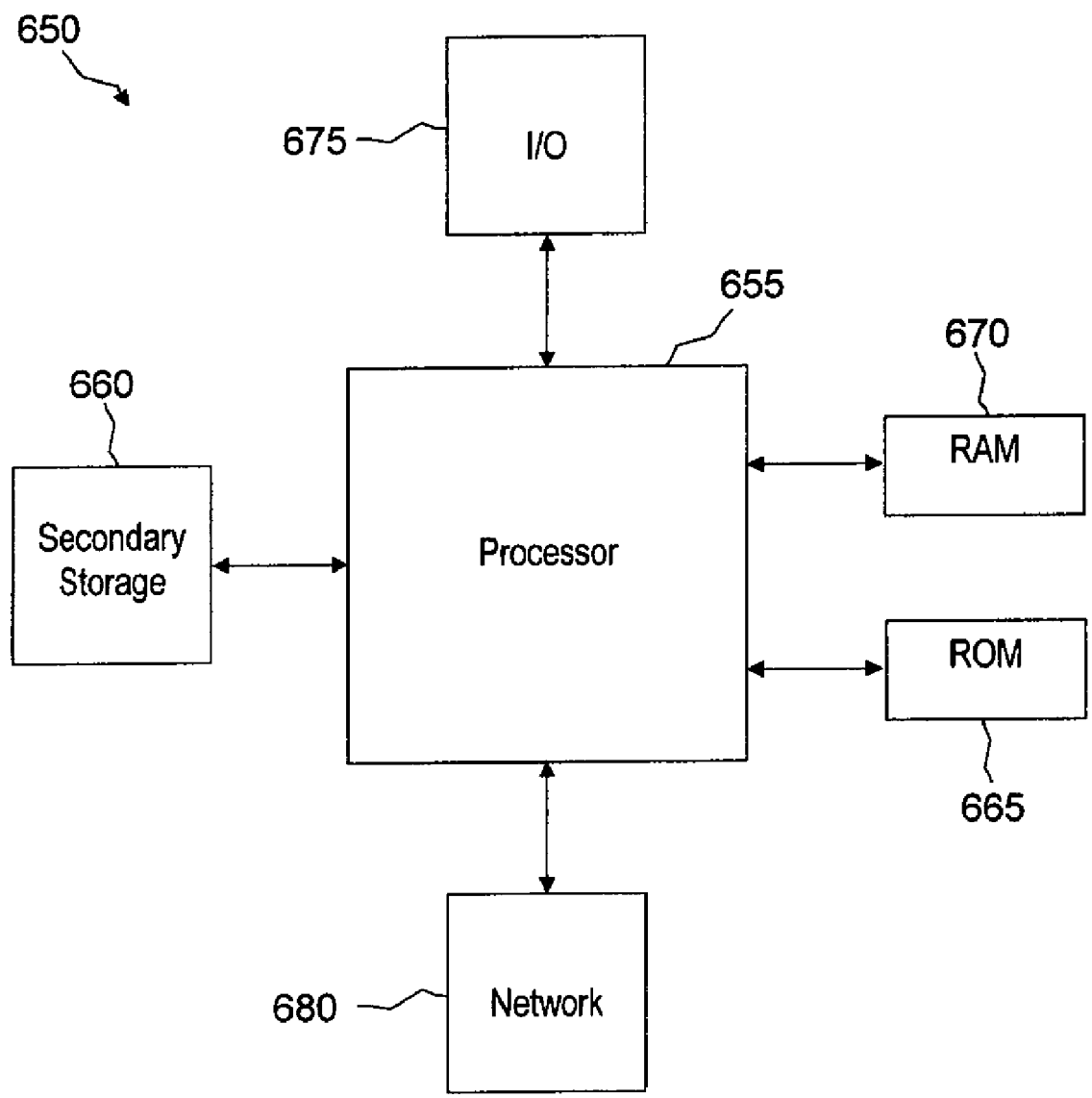
FIG. 5 is an illustrative general purpose computer system suitable for implementing methods of electronic premises access.

The systems and methods described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 650 includes a processor 655 (which may be referred to as a central processor unit or CPU) that is in communication with memory devices including secondary storage 660, read only memory (ROM) 665, random access memory (RAM) 670, input/output (I/O) 675 devices, and network connectivity devices 680. The processor may be implemented as one or more CPU chips.

The secondary storage 660 is typically comprised of one or more disk drives or tape drives and is used for non-volatile storage of data and as an over-flow data storage device if RAM 670 is not large enough to hold all working data. Secondary storage 660 may be used to store programs which are loaded into RAM 670 when such programs are selected for execution. The ROM 665 is used to store instructions and perhaps data which are read during program execution. ROM 665 is a non-volatile memory device which typically has a small memory capacity relative to the larger memory capacity of secondary storage. The RAM 670 is used to store volatile data and perhaps to store instructions. Access to both ROM 665 and RAM 670 is typically faster than to secondary storage 660.

I/O 675 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 680 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 680 devices may enable the processor 655 to communicate with an Internet or one or more intranets. With such a network connection, it is contemplated that the processor 655 might receive information from the network, or might output information to the network in the course of performing the above-described method steps. Such information, which is often represented as a sequence of instructions to be executed using processor 655, may be received from and outputted to the network, for example, in the form of a computer data signal embodied in a carrier wave.

Such information, which may include data or instructions to be executed using processor 655 for example, may be received from and outputted to the network, for example, in the form of a computer data baseband signal or signal embodied in a carrier wave. The baseband signal or signal embodied in the carrier wave generated by the network connectivity 680 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 655 executes instructions, codes, computer programs, scripts which it accesses from hard disk, floppy disk, optical disk (these various disk based systems may all be considered secondary storage 660), ROM 665, RAM 670, or the network connectivity devices 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of electronic premises access to serve a warrant that comprises:
    receiving an identity credential and the warrant at a portal to a secure premises;
    identifying an issuing authority of the identity credential by an electronic premises access system based on information provided by the identity credential and based on a set of rules, wherein the issuing authority of the identity credential is one of a local law enforcement agency, a state law enforcement agency, and a federal law enforcement agency;
    identifying an issuing authority of the warrant by the electronic premises access system based on information provided by the warrant and based on the set of rules, wherein the issuing authority of the warrant is a court;
    requesting identity validation data by the electronic premises access system from the issuing authority of the identity credential;
    requesting warrant data by the electronic premises access system from the issuing authority of the warrant;
    validating the identity credential by the electronic premises access system based on the identity validation data;
    validating the warrant by the electronic premises access system based on the warrant data; and
    permitting entry to the secure premises if the identity credential and warrant are valid.

2. The method of claim 1, wherein the warrant is wirelessly transmitted to the identity credential by the issuing authority of the warrant and said receiving is accomplished by wirelessly transmitting the warrant from the identity credential to a wireless communication device at the portal.

3. The method of claim 1, further comprising decrypting the identity credential and the warrant.

4. The method of claim 1, wherein the identity credential is one of a police officer's shield and a police officer's badge.

5. The method of claim 1, further comprising storing a record containing details relating to said receiving, identifying, validating, and permitting.

6. The method of claim 1, wherein said validating the identity credential comprises verifying the physical location of the identity credential.

7. The method of claim 1, determining the warrant to be invalid by the electronic premises access system when an address associated with the portal to the secure premises is different from an address identified by the warrant data.

8. The method of claim 1, wherein requesting identity credential data further comprises the electronic premises access system requesting the issuing authority of the identity credential to initiate live communication with a law enforcement agent associated with the identity credential for additional verification.

9. The method of claim 1, wherein permitting entry to the secure premises is further based on whether access limitations identified by the identity credential data compare with an access restriction level of the portal to the secure premises.

10. The method of claim 1, wherein the credential validation data comprises one or more of a shield number, a badge number, a name, and a duty status.

11. The method of claim 10, wherein the duty status is one of an active duty status, a suspended status, a medical leave status, and a retired status.

12. The method of claim 1, further comprising receiving a personal identification number (PIN) at the portal to the secure premises, and wherein requesting the identity validation data by the electronic premises access system comprises sending an identification credential request comprising the personal identification number to the issuing authority of the identity credential.

13. The method of claim 12, wherein the request for the identification validation data further comprises the information provided by the identity credential.

14. The method of claim 1, wherein requesting the warrant data by the electronic premises access system comprises sending a warrant data request comprising the information provided by the warrant to the issuing authority of the warrant.

15. The method of claim 1, further comprising sending notification to a recipient of a permitted entry by a law enforcement agent associated with the identity credential.

16. The method of claim 15, wherein the notification is sent by one of electronic mail and wireless communication to the recipient.

17. The method of claim 1, wherein the warrant data comprises one of a date of issue of the warrant, a validity period of the warrant, a subject of the warrant, a place associated with the warrant, and a name of a judge issuing the warrant.

18. The method of claim 1, wherein the secure premises is one of a commercial office building and a residential apartment.

19. The method of claim 1, wherein the identity validation data is requested by the electronic premises access system from an identity issuing server operated by the identity issuing authority, wherein the identity issuing server is different from the electronic premises access system.

20. The method of 1, wherein the warrant data is requested by the electronic premises access system from a warrant issuing server operated by the warrant issuing authority, wherein the warrant issuing server is different from the electronic premises access system.

* * * * *